United States Patent [19]
Tsai

[11] Patent Number: 5,486,823
[45] Date of Patent: Jan. 23, 1996

[54] KEYBOARD SYSTEM CAPABLE OF ALLOWING SINGLE-HAND INPUT OPERATION

[75] Inventor: Wen-Hung Tsai, Tokyo, Japan

[73] Assignee: Kabushiki Kaisha Toshiba, Kawasaki, Japan

[21] Appl. No.: 178,752

[22] Filed: Jan. 7, 1994

[30] Foreign Application Priority Data

Jan. 14, 1993 [JP] Japan ................................. 5-004878

[51] Int. Cl.⁶ ............................. H03K 17/94; G06F 3/00
[52] U.S. Cl. ................... 341/22; 341/20; 341/26; 364/709.14; 364/709.12
[58] Field of Search ................... 341/20, 22, 26, 341/23; 379/97, 52; 364/709.14, 709.15, 709.12, 709.16

[56] References Cited

U.S. PATENT DOCUMENTS

| | | | |
|---|---|---|---|
| 3,967,273 | 6/1976 | Knowlton | 341/22 |
| 4,307,266 | 12/1981 | Messina | 379/97 |
| 4,427,848 | 1/1984 | Tsakanikas | 379/97 |
| 4,608,457 | 8/1986 | Fowler et al. | 379/52 |
| 4,650,927 | 3/1987 | James | 379/97 |
| 5,117,455 | 5/1992 | Danish | 341/22 |

FOREIGN PATENT DOCUMENTS

| | | |
|---|---|---|
| 1-106642 | 4/1989 | Japan . |
| 4-139520 | 5/1992 | Japan . |

*Primary Examiner*—John K. Peng
*Assistant Examiner*—Daniel J. Wu
*Attorney, Agent, or Firm*—Oblon, Spivak, McClelland, Maier & Neustadt

[57] ABSTRACT

According to this invention, a keyboard is constituted by 15 keys, and 4-bit data is sent to a keyboard controller in response to depression of a key. The keyboard controller detects the permutation of two continuously depressed keys. A key code is picked on the basis of the permutation with reference to a table stored in advance, and is sent to a system main body. The keyboard controller updates the table to another table in response to depression of a specific key.

12 Claims, 7 Drawing Sheets

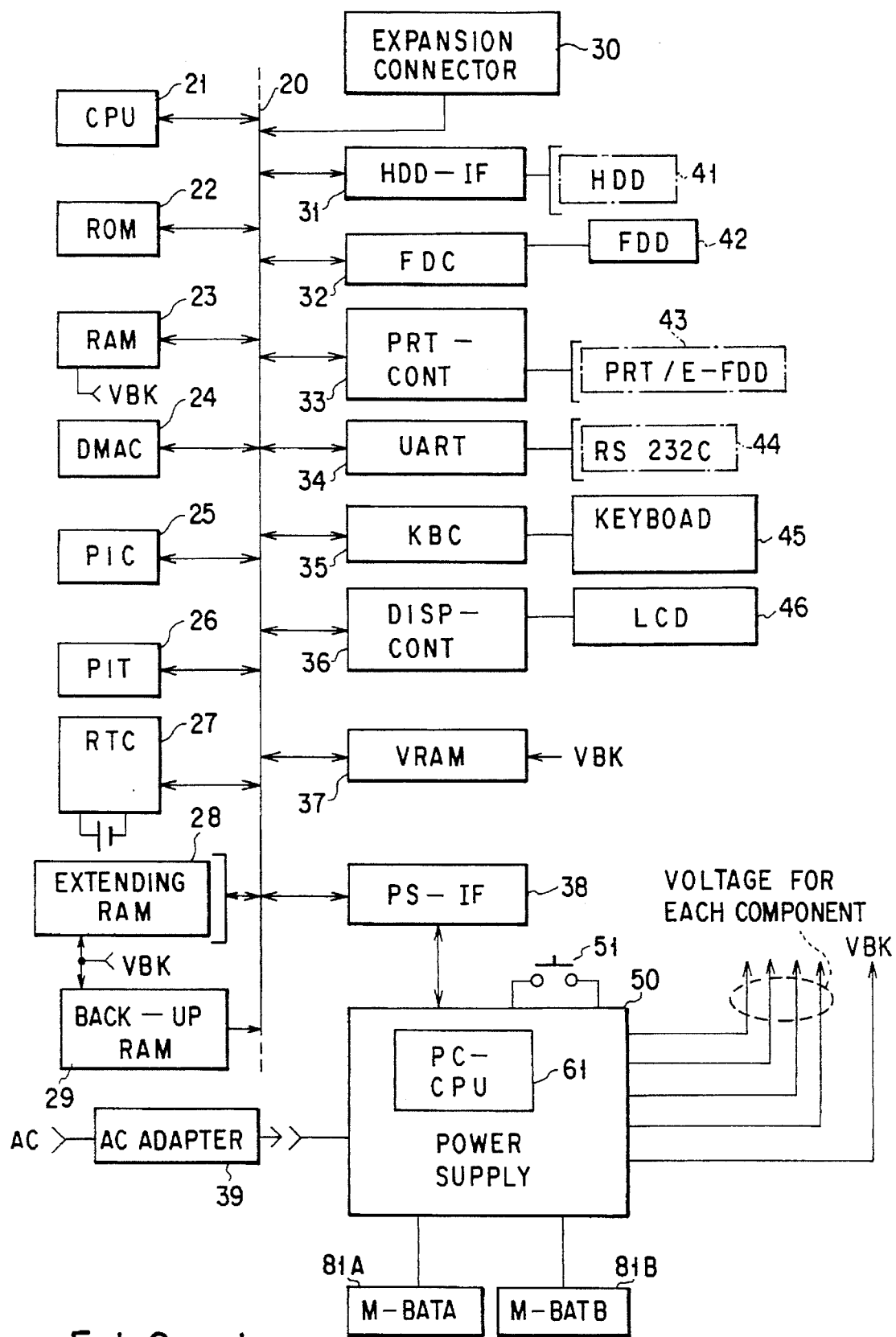
F I G. 1

| LETTER | PRESS KEY |
|---|---|
| a | 0 0 |
| b | 1 1 |
| c | 2 2 |
| d | 3 3 |
| e | 4 4 |
| f | 5 5 |
| g | 6 6 |
| h | 7 7 |
| i | 8 8 |
| j | 9 9 |
| k | 1 0 |
| l | 2 0 |
| m | 4 1 |
| n | 2 1 |
| o | 5 2 |
| p | 3 2 |
| q | 2 3 |
| r | 6 3 |
| s | 7 4 |
| t | 5 4 |
| u | 8 5 |
| v | 6 5 |
| w | 5 6 |
| x | 9 6 |
| y | 8 7 |
| z | 7 8 |
| Caps Lock | 8 9 |

| | 13 | 14 |
|---|---|---|
| 0 0 0 1 | 0 0 1 0 | 0 0 1 1 |
| 0 1 0 0 | 0 1 0 1 | 0 1 1 0 |
| 0 1 1 1 | 1 0 0 0 | 1 0 0 1 |
| 1 0 1 0 | 1 0 1 1 | 1 1 0 0 |
| 1 1 0 1 | 1 1 1 0 | 1 1 1 1 |

| Mode | Ctrl | Alt |
|------|------|-----|
| 7 ⁸  | 8 ✱  | 9 ( |
| 4 $  | 5 %  | 6 ^ |
| 1 !  | 2 @  | 3 # |
| 0 )  | Shift | Enter ⏎ |

TYPE 2

FIG. 6A

| Mode | Ctrl | Alt |
|------|------|-----|
| -  _ | = +  | [ { |
| ] }  | ; :  | ' " |
| , <  | . >  | / ? |
| \ \| | Shift | Enter ⏎ |

TYPE 3

FIG. 6B

| Mode | Ctrl | Alt |
|------|------|-----|
| Home | ↑ | PgUp |
| ←    | ⇄ | →    |
| End  | ↓ | PgDn |
| Num Lock | Ins | Enter ⏎ |

TYPE 4

FIG. 6C

| Mode | Ctrl | Alt |
|------|------|-----|
| Esc  | Prtsc ✱ | Sys Req |
| Num Lock | Scroll Lock | ⇐ |
| \ \| | Fn | Caps Lock |
| ` ~ _ | Shift | Enter ⏎ |

TYPE 5

FIG. 6D

| Mode | F1 | F2 |
|------|----|----|
| F3 | F4 | F5 |
| F6 | F7 | F8 |
| F9 | F10 | F11 |
| F12 | F13 | F14 |

TYPE 6

FIG. 6E

KEYBOARD SYSTEM CAPABLE OF ALLOWING SINGLE-HAND INPUT OPERATION

BACKGROUND OF THE INVENTION

1. Field of the Invention

The present invention relates to a keyboard system applied to an electronic device using a keyboard for inputting information and, more particularly, to a keyboard system applied to a compact computer such as a portable computer or a pocket computer which can be easily carried.

2. Description of the Related Art

In recent years, a personal computer has been decreased in size and weight, and has been easily carried. In addition, a high-performance, multifunctional personal computer has been manufactured. The high-performance, multifunctional personal computer can be realized by a system arrangement whose functions can be expanded by connecting an arbitrary input/output device to a connection port for an external device. In particular, in reagent years, a personal computer such as a lap-top type personal computer or a book type personal computer which can be driven by a battery and has a large-capacity memory device such as a hard disk drive (HDD) or a RAM (Random Access Memory) pack has been popularly used in various fields. In this manner, a multifunctional computer system which can be easily carried is not only used on a desk but also used to be held by an operator in his/her hand. When information is input in this state, since one hand holds the system, the information must be input by the other hand.

A keyboard applied to a conventional personal computer is an 84-key keyboard, 101/102-key keyboard or the like. In each of these keyboards, 80 or more keys are arranged. For this reason, when information is to be input by one hand information cannot be efficiently input by an operator with one hand.

In addition, a conventional keyboard requires a certain space for arranging keys. This space poses a problem when a portable computer is further decreased in size. When a present inputting method is used, at least 40 keys are required in a keyboard. For this reason, an operator cannot input information with one hand.

As described above, as a method of reducing the number of keys of the keyboard in order to decrease the size of the keyboard or input letters with a single hand, "keyboard apparatus for inputting Japanese with a small number of keys" is proposed by FUJITSU LTD. (Jpn. Pat. Appln. KOKAI Publication No. 4-139520). In this publication, an apparatus for inputting Japanese on the basis of the Roman letters is disclosed, and a keyboard apparatus for inputting English letters is also disclosed. In this English letter inputting keyboard apparatus proposed by FUJITSU LTD., in order to reduce the number of keys, each English letter is assigned to a corresponding one of the keys arranged on the keyboard apparatus, and not only each English letter can be input by depressing a corresponding one of the keys, but also each of the English letters which cannot be respectively assigned to the keys of the keyboard can be input by simultaneously depressing corresponding two of the keys of the keyboard. That is, in the keyboard apparatus described above, after it is detected that an arbitrary key (to be referred to as a first key hereinafter) is depressed, depression of the next key is waited for a predetermined period of time. In this case, when another key (to be referred to as a second key hereinafter) is depressed within the predetermined period of time, a key code representing an English letter assigned by the combination of the first and second keys is output. On the other hand, when any key is not depressed within the predetermined period of time, a key code representing the English letter assigned to the first key is output.

In this keyboard apparatus, however, in order to input the English letter assigned to simultaneous depression of the two keys, after the first or second key is depressed, the other key must be depressed within the predetermined period of time. Therefore, an operator must recognize in advance a key or combination of two keys to which each English letter is assigned. For this reason, in order to input English letters, an operator must have skills in the input operation of this keyboard. For example, after one key of the combination of two keys assigned to an arbitrary letter is depressed, if the predetermined period of time has passed while the other key is searched on the keyboard, the keyboard apparatus recognizes that the letter assigned to the key depressed first is input. For this reason, only an operator who has satisfactorily learned the key arrangement of the keyboard apparatus can efficiently perform the letter input operation.

SUMMARY OF THE INVENTION

It is the first object of the present invention to provide a keyboard system capable of realizing a compact computer.

It is the second object of the present invention to provide a keyboard system which has a small number of keys and allows a single-hand input operation.

In order to achieve the above objects, according to the first aspect of the present invention, there is provided a keyboard system connected to a computer system and having a plurality of keys, comprising: generating means for detecting depression of an arbitrary key included in the plurality of keys to generate a key scan code corresponding to the depressed key; first holding means for holding data having a size twice that of the key scan code generated by the generating means and a system scan code supplied to the computer system in correspondence with the key scan code; second holding means for holding the key scan code generated by the generating means; determining means for checking whether a key scan code is held in the second holding means; first control means for checking in accordance with the key scan code generated by the generating means whether a specific key is depressed and executing a process pre-assigned to the specific key upon determining depression of the specific key; and second control means for, when the determining means determines that the key scan code is already held in the second holding means, and a next key scan code is generated by the generating means, generating first data having a size twice that of a single key scan code and constituted by the next key scan code generated by the generating means and the key scan code already held in the second holding means, detecting a system code corresponding to the first data with reference to the first holding means, and sending the system code to the computer system.

According to the second aspect of the present invention, there is provided a keyboard control method applied to a keyboard system connected to a computer system and having a plurality of keys, a code generator for detecting depression of an arbitrary key included in the plurality of keys to generate a key scan code corresponding to the arbitrary key, and holding means for holding the key scan code generated by the code generator, comprising the steps of: a) holding data having a size twice that of a key scan code generated by the code generator and a system scan code supplied to the computer system in correspondence with the key scan code; b) checking whether a key scan code is held in the holding means: c) checking in accordance with the key scan code generated by the code generator whether a specific key is depressed and, if the specific key is depressed, executing a process pre-assigned to the specific key; and d) when it is determined in the step b) that a key scan code is already held in the holding means, and a next key scan code is generated by the code generator, defining, as first data, the data having a size twice that of a key scan code constituted by the next key scan code and the key scan code already held in the holding means referring to the data held in the step a), detecting a system key code corresponding to the first data, and sending the system key code to the computer system.

With the arrangement described above, a permutation of two keys depressed on the keyboard constituted by a small number of keys are detected. A letter code is generated on the basis of the permutation, and this code is sent to the computer system. In the keyboard system described above, the 26 English letters can be input with 10 keys. Therefore, the number of keys on the keyboard can be reduced, and the 26 letters can be input with one hand.

In the keyboard system described above, the permutation of a plurality of keys continuously depressed on the keyboard constituted by, e.g., 15 keys are detected. On the other hand, one key of the 15 keys of the keyboard system is defined as a specific key in advance, and a table for storing a key code is updated in response to depression of the specific key. In the keyboard system described above, various symbols including letters numbers, special symbols can be input with the keyboard having the 15 keys. Therefore, the size of the entire electronic device incorporated with the keyboard system can be decreased.

In the above keyboard system, each of the stored combinations except for multiple combinations is of adjacent keys. Therefore, an operator can be easily input arbitrary letters.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a system block diagram showing the arrangement of a portable computer to which a keyboard system according to an embodiment of the present invention is applied;

FIGS. 6A to 6E are views showing key arrangements of types 1 to 6 included in the keyboard system according to an embodiment of the present invention;

DETAILED DESCRIPTION OF THE PREFERRED EMBODIMENT

Figure 2:
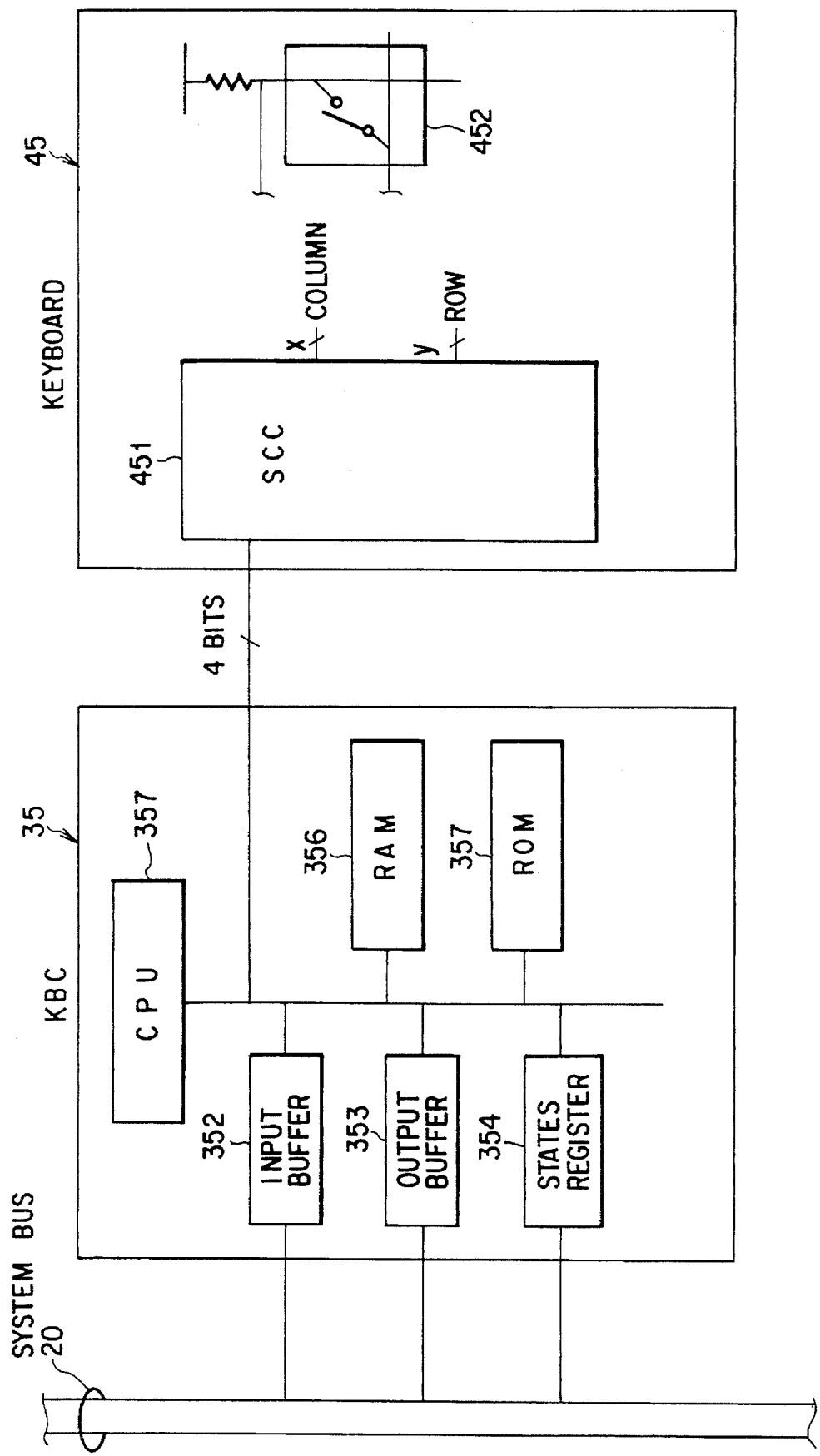
FIG. 2 is a block diagram showing the arrangement and connection between the keyboard controller (KBC) and the key board shown in FIG. 1.

An embodiment of the present invention will be described below with reference to the accompanying drawings.

FIG. 1 shows the arrangement of a portable computer to which a keyboard system according to an embodiment of the present invention is applied. Referring to FIG. 1, a system bus 20 is constituted by a data bus, an address bus, and a control bus and transmits information required for operating a computer. Constituent elements 21 to 38 (to be described later) are connected to the system bus 20.

A CPU (Central Processing Unit) 21 controls the entire system. When a power switch is turned on, the CPU 21 accesses a ROM 22 and executes an alarm operation designating routine and an alarm release designating routine. A ROM (Real Only Memory) 12 stores permanent programs and permanent data such as a BIOS (Basic Input/Output System). A RAM (Random Access Memory) 23 stores a program and data to be processed. A backup voltage (VBK) is always applied to the RAM 23 even when a main power supply is set in an OFF state.

A direct memory access Controller (DMAC) 24 controls direct memory access. A programmable interrupt controller (PIC) 25 is an interrupt controller which can be set by a program. A programmable interval timer (PIT) 26 is an interval timer which can be set by a program. A real-time clock (RTC) 27 is a clock module having an independently operated battery.

An extending RAM 28 is detachably inserted in a predetermined slot to increase the main memory capacity of a computer. In addition, the backup voltage VBK is applied to the extending RAM 28. A backup RAM 29 is used as, e.g., a data storage area for realizing a resume function. The backup voltage VBK is applied to the backup RAM 29 as in the extending RAM 28, and the contents of a memory or register immediately before the power switch is turned off are stored in the backup RAM 29.

An expansion connector 30 is a bus connector for expanding a function. An external hard disk drive (external HDD) or the like is selectively connected to the expansion connector 30 as needed, or selectively connected to an expansion unit having various constituent elements (e.g., a keyboard, a CRT display, a large-capacity memory, a personal computer mounting mechanism, or the like) for expanding a function, thereby performing circuit coupling.

An incorporated HDD (having a hard disk drive controller (FDC)) 41 is interface-connected to a hard disk drive interface (HDD-IF) 31 when the system is upgraded to a hard disk drive mounting type (hard disk drive (HDD)) system. A floppy disk controller (FDC) 32 controls a floppy disk driver (FDD) 42 on the basis of control of the CPU 21. The floppy disk drive(FDD) 42 accesses a floppy disk.

A printer controller (PRT-CONT) 33 controls a printer (PRT) or an external floppy disk drive (E-FDD) 43 connected as needed. An RS-232C 44 is connected to an input/output interface (UART: Universal Asynchronous Receiver/Transmitter) 34 as needed, and the input/output interface 34 performs transmission/reception of data with an external device. A keyboard 45 is connected to a keyboard controller (KBC) 35. The keyboard controller 35 performs an operation such as an operation of sending data input from the keyboard 45 to the CPU 21 so as to control the keyboard 45. These operations will be described later.

A display controller (DISP-CONT) 36 controls a liquid crystal display (LCD) 46. A VRAM (Video RAM) 37 is applied with the backup voltage VBK and stores display image data.

A parallel/serial interface (PS-IF) 38 is a power supply control interface for connecting an intelligent power supply (to be referred to as a power supply device hereinafter) 50 having a power supply control microprocessor (PC-CPU) 61 for controlling the power supply to the CPU 21 through the system bus 20.

The power supply device 50 performs centralized management of a system power supply. The power supply device 50 has a power supply switch 51 for receiving an ON/OFF signal for the system power supply from an operator.

The PC-CPU 61 is operated by an operating power supply voltage Vm generated by a power supply adopter (AC adopter) 39 or main batteries 81A and 81B. The PC-CPU 61 always monitors and controls the power supply regardless of the ON/OFF state of the system power supply controlled by the operation of the power supply switch 51.

The arrangements of the KBC 35 and the keyboard 45 shown in FIG. 1 will be described below with reference to FIG. 2. The keyboard 45 is connected to the KBC 35 by four lines, and parallelly transmits a 4-bit key scan code (to be referred to as a KSC hereinafter) to the KBC 35 in response to depression of a key. The keyboard 45 is constituted by a scan controller (to be referred to as an SCC hereinafter) 451 and a plurality of key switch matrixes 452. The key switch matrixes 452 are arranged to correspond to key pads arranged in the keyboard 45, respectively. Note that since 15 key pads are arranged in this embodiment, the keyboard 45 has the 15 key switch matrixes 452. The SCC 451 always scans the columns and rows of the plurality of key switch matrixes 452 to detect a key which is depressed. The SCC 451 outputs a KSC (4 bits in this embodiment) corresponding to the depressed key to the KBC 35. In this embodiment, when the same key is continuously depressed (continuous depresseion), the SCC 451 outputs only the KSC corresponding to the key depression detected first, and cancels the output of a KSC corresponding to the key depression detected second or more.

The KBC 35 receives a KSC sent from the keyboard 45, converts the KSC to a system scan code (SSC) with reference to a predetermined table, and sends the SSC to the system bus 20. The KBC 35 has various buffers and registers for transmitting/receiving information from/to the system main body. An input buffer 352 temporarily stores data sent from the system main body on the basis of an OS (Operating System). An output buffer 353 temporarily stores an SSC sent to the CPU 21 of the system main body through the system bus 20. A status register 354 stores predetermined data for informing the system main body of the state of the KBC 35. The KBC 35 further has a RAM 356 and a ROM 357. The RAM 356 holds a KSC sent from the keyboard 45 or a table copied from the ROM 357. The memory arrangement of the RAM 356 will be described later. The ROM 357 stores various tables required when a KSC is converted into an SSC, and permanent programs such as a control program required for controlling the KBC 35.

Figure 3:
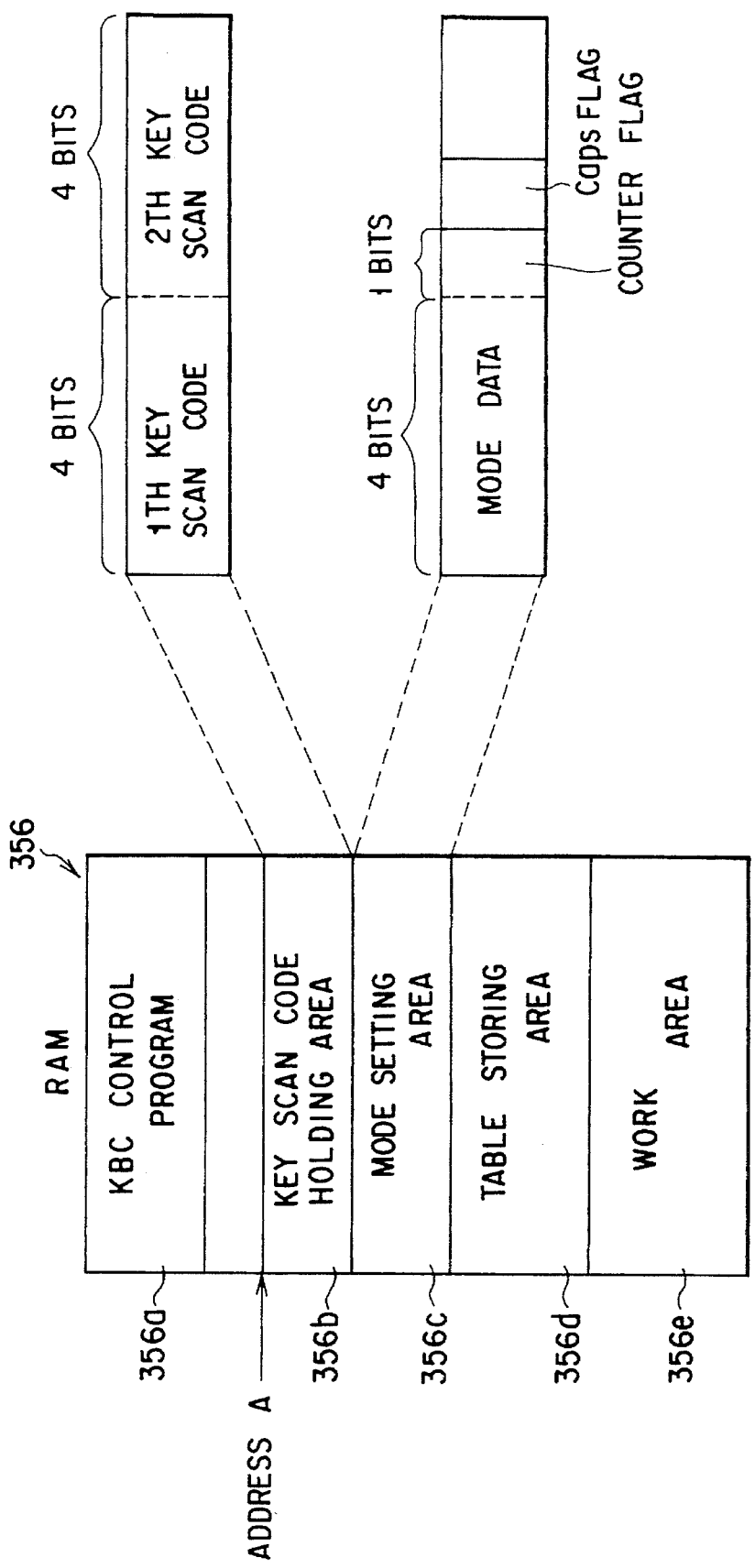
FIG. 3 is a block diagram showing the memory arrangement of a RAM shown in FIG. 2.

The memory arrangement of the RAM 356 shown in FIG. 2 will be described below with reference to FIG. 3. The RAM 356 is mainly constituted by a KSC control program area 356a, a KSC holding area 356b, a mode setting area 356c, a table storing area 356d, and a work area 356e. When the system main body is started to perform initialization, a KBC control program is copied in the KSC control program area 356a from the ROM 357, A 4-bit KSC sent from the keyboard 45 is stored in the KSC holding area 356b. As shown in FIG. 3, the KSC holding area 356b has an 8-bit area and can hold two KSCs (first and second KSCs) sent from the keyboard 45. In this embodiment, the KSC holding area 356b occupies an area started from address A in the RAM 356. In the mode setting area 356c, data representing a mode corresponding to each key arrangement (to be described later) is stored, and an area for storing a counter flag representing that the first KSC is stored in the KSC holding area 356b is formed. When the first KSC is stored in the KSC holding area 356b, the counter flag is set. In the mode setting area 356c, an area for holding a Caps flag is further formed. When a key corresponding to the Caps flag is depressed, a CPU 351 sets the Caps flag in this area.

A table referred to when a KSC is converted into an SSC is stored in the table storing area 356d. In this case, as the table to be stored, only a table corresponding to the mode is copied from the ROM 357 and stored in the table storing area 356d. A KSC sent from the keyboard 45 is temporarily held in the work area 356e until the KSC is stored in the KSC holding area or is subjected to predetermined processing.

Figures 4A, 4B:
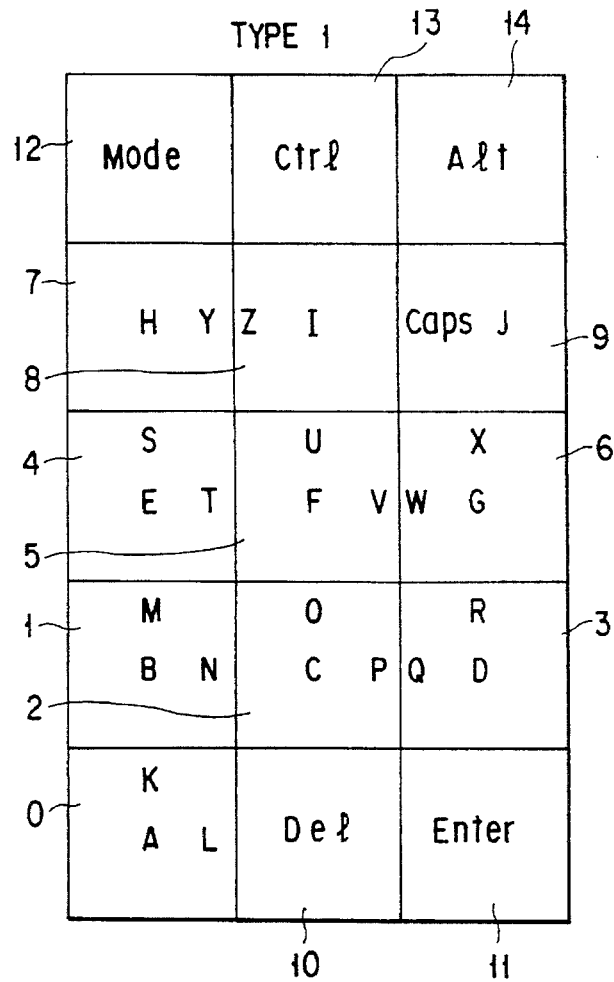
FIG. 4A is a view showing a first example (type 1) of the key arrangement of the keyboard system according to the present invention.
FIG. 4B is a table showing combinations of keys which are depressed when a letter is input on the key arrangement shown in FIG. 4A.

A first example (type 1) of the key arrangements of the keyboard 45 of this embodiment and an input operation performed on this key arrangement will be described below with reference to FIGS. 4A and 4B. FIG. 4A shows type 1 which is a key arrangement corresponding to letters. Note that the keyboard 45 of this embodiment is constituted by 15 keys as described above. The keys 0 to 9 are used for inputting letters. The delete (Del) key 10 is used for deleting letters. The enter (Enter) key is depressed to end a letter input operation. The mode (Mode) key 12 is used for changing a key arrangement of letters into a key arrangements of each type (to be described later). The control (Ctrl) key 13 and the alt (Alt) key 14 are used for performing special functions or predetermined functions. After either the control key 13 or the alt key 14 is depressed, when another key is depressed, various functions can be performed.

An actual input operation of letters will be described below. When the lowercase letter "a" is to be input, the key 0 is depressed twice. In this manner, each of the lowercase letters "a" to "j" can be input such that a corresponding one of the keys 0 to 9 is depressed twice. On the other hand, each of the lowercase letters "k" to "z" is input such that a pair of different keys are depressed in a predetermined order. For example, when "k" is to be input, after the key 1 is depressed, the key 0 is depressed. When "z" is to be input, after the key 7 is depressed, the key 8 is depressed. According to this method, the letters "k" to "z" can be input.

In this embodiment, when the key 5 is depressed after the key 6 is depressed, the lowercase letter "v" is input; and when the key 6 is depressed after the key 5 is depressed, the letter "w" is input. However, when the keys 5 and 8 are depressed in any order, the letter "u" is input due to the following reason. That is, no letter corresponds to the permutation in which the key 8 is depressed after the key 5 is depressed.

When an uppercase letter is to be input, and the key 9 is depressed after the key 8 is depressed, the KBC 35 is set in an uppercase letter lock (Caps Lock) state. In this state, uppercase letters can be input in the same key operation as that performed when lowercase letters are input. A correspondence table between letters and combinations between depressed keys according to the input operation described above is shown in FIG. 4B.

Figures 5, 7:
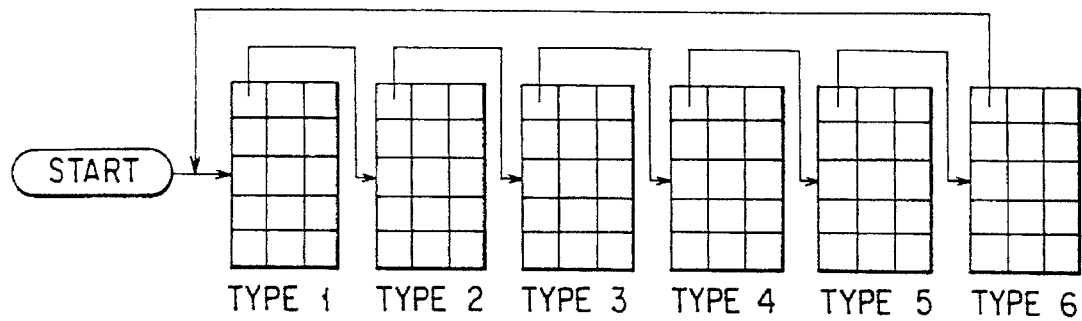
FIG. 5 is a view showing a design concept of key arrangements of 6 types included in the keyboard system according to an embodiment of the present invention.
FIG. 7 is a view showing key scan codes (KSC) assigned to the keys of the keyboard system of the present invention.

The design concept of key arrangements of 6 types according to this embodiment will be described below with reference to FIG. 5. As shown in FIG. 5, the computer system of this embodiment has key arrangement patterns of 6 types including the key arrangement of the letters. After this computer system is started, an input operation can be performed on the key arrangement of type 1. On the other hand, the mode key 12 is arranged at the upper left corner of each of the key arrangements. When this mode key is depressed, the key arrangement can be changed to another key arrangement. For example, when the mode key is depressed on the key arrangement of type 1, the key arrangement is changed into the key arrangement of type 2; and when the mode key is depressed on the key arrangement of type 2, the key arrangement is changed to the arrangement of type 3. In this manner, when the mode key is depressed, the key arrangement of type 1 can be changed into the key arrangement of type 2, the key arrangement of type 2 can be changed into the key arrangement of type 3, . . . , or the key arrangement of type 6 can be changed into the key arrangement of type 1.

Of the key arrangements of 6 types, the key arrangements except for the key arrangement of the letters are shown in FIGS. 6A to 6E. The key arrangement of type 2 is a key arrangement for inputting numbers and special symbols, and the key arrangement of type 3 is for inputting complex symbols. Keys for moving a cursor and performing scrolling are assigned to the key arrangement of type 4, special control keys are assigned to the key arrangement of type 5, and function keys are assigned to the key arrangement of type 6.

Figure 8:
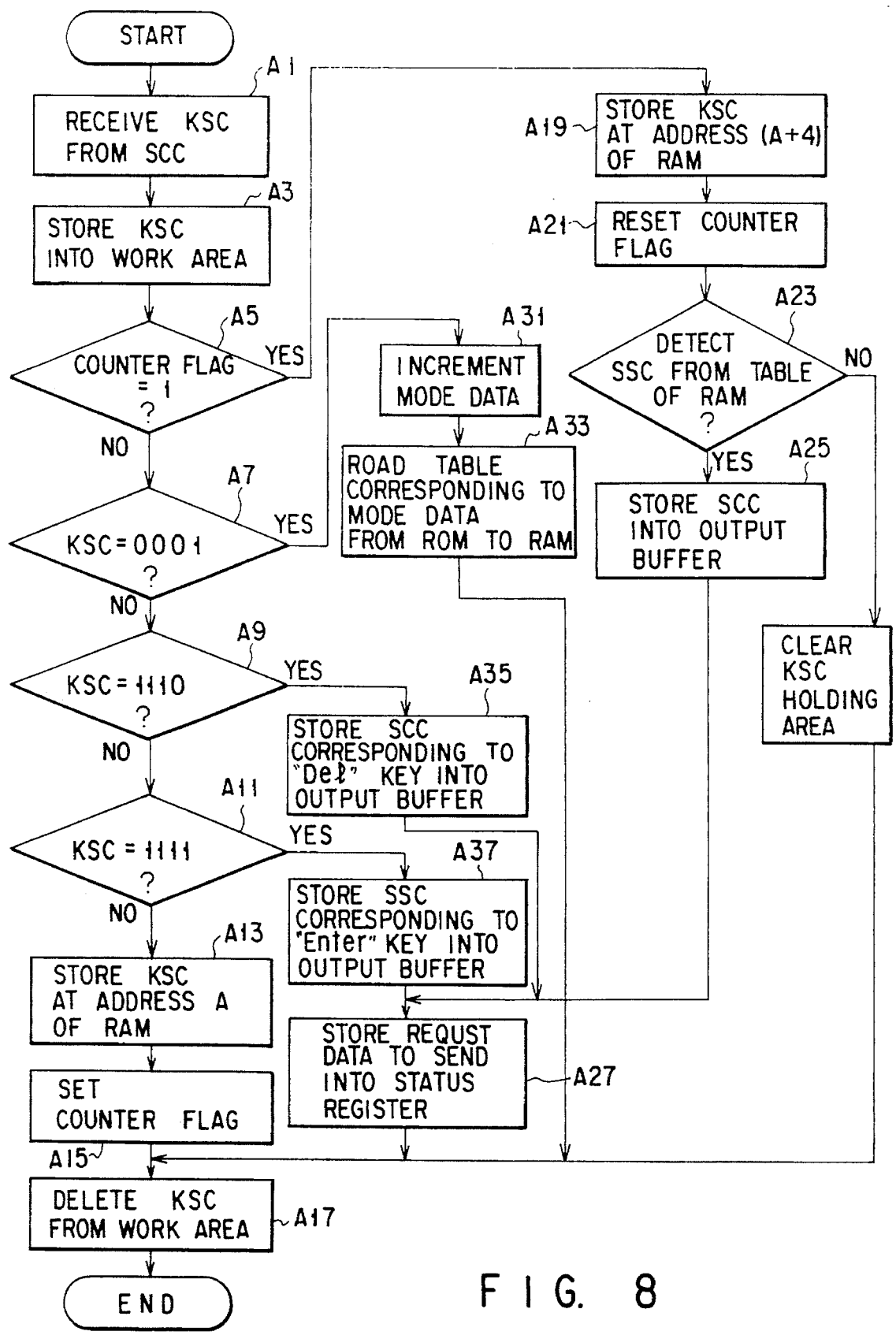
FIG. 8 is a flow chart showing an operation of a KBC when information is input by an operator using the key arrangement of type 1 shown in FIG. 4A in the keyboard system of the present invention.

An operation of the KBC 35 performed in response to depression of a key arranged in the keyboard 45 will be described below with reference to the flow chart in FIG. 8. In this case, a case wherein the key board 45 has the key arrangement of type 1 for a letter input mode will be described below. The keyboard 45 has the 15 keys as described above, and physical position codes are assigned to the keys. These physical position codes are shown in FIG. 7. Each of the physical position codes shown in FIG. 7 corresponds to a KSC output from the SCC 451 in response to depression of a key. For example, when the mode key 12 is depressed, the SCC 451 outputs a KSC (physical position code) "0001" to the KBC 35.

Therefore, while the computer system shown in FIG. 1 is operated, when any key of the keyboard 45 is depressed, depression of the key is detected by the SCC 451. In addition, the CPU 351 for entirely controlling the KBC 35 receives a 4-bit KSC (physical position code) sent from the keyboard 45 and stores it in the work area 356e of the RAM 356 (steps A1 and A3). The CPU 351 checks whether a counter flag stored in the mode setting area 356c is set (whether the flag is set to be "1") (step A5).

When the counter flag is set to be "0" (NO in step A5), the CPU 351 checks whether the KSC stored in the work area 356e is "0001" (step A7). When the KSC is not "0001" (NO in step A7), the CPU 351 checks whether the KSC is "1110" (step A9). When the KSC is not "1110" (NO in step A9), the CPU 351 checks whether the KSC is "1111" (step A11).

When the KSC is not "1111", i.e, if NO in steps A5, A7, A9, and A11, the CPU 351 stores the KSC at address A of the RAM 356. In this manner, the KSC sent from the keyboard 45 is stored in the area for storing the first KSC of the KSC holding area 356b. Thereafter, the CPU 351 sets a counter flag in the mode setting area 356c, i.e., the counter flag is set to be "1" (step A15), and deletes the KSC stored in the work area 356e (step A17), so that the processing corresponding to the key depression is ended.

when the counter flag is set to be "1" in step A5, the CPU 351 stores the KSC of the work area 356e at address (A+4) of the RAM 356 (step A19). Address (A+4) of the RAM 356 corresponds to the start address of the area for storing the second KSC of the KSC holding area 356b. On the other hand, since the counter flag is set to be "1", another KSC is stored in advance in the area for holding the first KSC of the KSC holding area 356b. As the KSC stored in the area for holding the first KSC, the KSC corresponding to a key previously depressed by an operator is stored. Therefore, the KSCs are respectively stored in both the areas for holding the first and second KSCs of the KSC holding area 356b. This means that the KSCs corresponding to the keys depressed recently and previously are stored in these areas, respectively.

After step A19, the counter flag is reset (step A21). The CPU 351 refers to the table stored in the table storing area 356d and detects an SSC corresponding to 8-bit data (first and second KSCs) stored in the KSC holding area 356b (step A23).

In step A23, when the SSC corresponding to 8-bit data is detected (YES in step A23), the CPU 351 stores the SCC in the output buffer 353 (step A25). The CPU 351 stores transmission request data in the status register 354 (step A27). In this manner, the CPU 351 loads the SSC stored in the output buffer 353 in response to the transmission request data from the KBC 35. After step A27, the CPU 351 deletes the KSC stored in the RAM 356 (step A17), so that the processing corresponding to the key depression is ended.

In this manner, when the processing in steps A19, A21, A23, A25, A27, and A17 is performed, an SSC corresponding to a permutation with the previously depressed key can be output to the system main body. For example, when the key arrangement of the keyboard 45 is of type 1, i.e., is set in a mode for inputting letters, and the key 0 is depressed twice continuously, an SSC corresponding to the letter "a" is output to the system main body when the key 7 is depressed after the key 8 is depressed, an SSC corresponding to the letter "y" is output to the system main body.

If no SSC corresponding to 8-bit data is detected in step A23 (NO in step A), the CPU 351 clears the KSC holding area 356b to delete the two KSCs (first and second KSCs) stored in the KSC holding area 356b (step A29). Thereafter, the CPU 351 deletes the KSC stored in the work area 356e (step A17), so that the processing corresponding to the key depression is ended. In this manner, when a letter is input in accordance with the permutation of two keys, the operation described above is started again from depression of the first key.

In step A7, when the KSC stored in the work area 356e is "0001" (YES in step A7), this represents that a depressed key is the mode key. Therefore, the CPU 351 increments 4-bit mode data stored in the mode setting area 356c by one (step A31). Thereafter, a table corresponding to the changed mode data is loaded from the ROM 357 into the table storing area 356d (step A33). In this manner, the table stored in the table storing area 356d is updated, and the SSC corresponding to the KSC is changed. For example, when the mode key is depressed on the key arrangement of type 1 set in the letter input mode, this key arrangement is changed into the key arrangement (mode) of type 2 for inputting numbers and special symbols.

In step A9, when the KSC stores in the work area 356e is "1110" (YES in step A9), this represents the depressed key is the delete key. Therefore, the CPU 351 detects an SSC corresponding to the delete key with reference to the table storing area 356d (step A35). Thereafter, the CPU 351 stores transmission request data in the status register 354 (step A27). The CPU 21 of the system main body loads the SSC stored in the output buffer 353 through the system bus 20 in response to the transmission request data from the KBC 35. The CPU 351 deletes the KSC stored in the work area 356e (step A17), so that the processing corresponding to the key depression is ended.

When the KSC stored in the work area 356e is "1111" in step A11 (YES in step A11), this represents that the depressed key is the enter key. Therefore, the CPU 351 detects an SSC corresponding to the enter key with reference to the table storing area 356d and stores it in the output buffer 353 (step A37). Thereafter, the CPU 351 stores transmission request data in the status register 354 (step A27). In this manner, the CPU 21 of the system main body loads the SSC stored in the output buffer 353 through the system bus 20 in response to the transmission request data from the KBC 35. The CPU 351 deletes the KSC stored in the work area 356e (step A17), so that the processing corresponding to the key depression is ended.

With the processing described above, an SSC is generated when the keyboard 45 is operated using the key arrangement of type 1 set in the letter input mode.

As described above, when an SSC corresponding to a letter is generated in accordance with the permutation of two depressed keys (though some combinations are not related to permutations), the number of keys of the keyboard 45 can be reduced. In addition, according to this embodiment, since the keyboard 45 is constituted by 15 keys, the 26 English letters can be input by a single hand.

Since the key arrangement can be changed in accordance with depression of a specific key (mode key), in addition to the letters, various symbols including numbers and special symbols can be input with the keyboard having a small number of keys.

In addition, since the keyboard can be constituted by a small number of keys, a portable computer or the like can be more decreased in size.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A keyboard system connected to a computer system and having a plurality of keys, comprising:

generating means for detecting depression of an arbitrary key included in the plurality of keys to generate a key scan code corresponding to the depressed key;

first holding means for holding data having a size twice that of the key scan code generated by said generating means and system scan code supplied to said computer system in correspondence with the key scan code;

second holding means, coupled to said generating means, for holding the key scan code generated by said generating means;

determining means, coupled to said second holding means, for checking whether the key scan code is held in said second holding means;

first control means, coupled to said generating means, for checking in accordance with the key scan code generated by said generating means whether a specific key is depressed and executing a process pre-assigned to the specific key upon determining depression of the specific key; and second control means, coupled to said second holding means and said determining means, for, when said determining means determines that the key scan code is already held in said second holding means, and a next key scan code is generated by said generating means, defining, as first data, data having a size twice that of a single key scan code and constituted by the next key scan code generated by said generating means and the key scan code already held in said second holding means, detecting one of the system scan codes, corresponding to the first data stored in said first holding means, and sending the system scan code to said computer system.

2. A system according to claim 1, further comprising:

erasing means for erasing the key scan code held in said second holding means when the system code is sent by said second control means.

3. A system according to claim 2, wherein said determining means includes flag means, and when a key scan code is held in said second holding means, a flag is set in said flag means, and the flag in said flag means is reset when the system code is sent by said second control means.

4. A system according to claim 3, wherein said second holding means includes a first holding area for holding a first scan code and a second holding area for holding a second scan code, when said first control means determines in accordance with the key scan code generated by said generating means that a key except for the specific key is depressed, said first control means holds the key scan code generated by said generating means in the first holding area of said second holding means as the first scan code, and when said determining means determines that a key scan code is already held in said second holding means, said second control means holds the next key scan code generated by said generating means in the second holding area of said second holding means as the second scan code.

5. A system according to claim 4, wherein when said second control means detects no system key code corresponding to the first data, said erasing means erases the first and second scan codes held in said second holding means, and when said second control means detects no system code corresponding to the first data, said determining means resets a flag in said flag means.

6. A system according to claim 5, wherein said holding means holds data having a size twice that of a key scan code and a system scan code in a table form.

7. A system according to claim 5, wherein said first holding means includes the data having the size twice that of the scan code, the system scan code, and an arithmetic program capable of calculating a corresponding system scan code from the data having the size twice that of the key scan code.

8. A keyboard control method applied to a keyboard system connected to a computer system and having a plurality of keys, a code generator for detecting depression of an arbitrary key included in the plurality of keys to generate a key scan code corresponding to the arbitrary key, and holding means for holding the key scan code generated by said code generator, comprising the steps of:

a) holding data having a size twice that of a key scan code generated by said code generator and a system scan code supplied to said computer system in correspondence with the key scan code;

b) checking whether a key scan code is held in said holding means;

c) checking in accordance with the key scan code generated by said code generator whether a specific key is depressed and, if the specific key is depressed, executing a process pre-assigned to the specific key; and d) when it is determined in the step b) that a key scan code is already held in said holding means, and a next key scan code is generated by said code generator, defining, as first data, the data having a size twice that of a key scan code constituted by the next key scan code and the key scan code already held in said holding means, referring to the data held in the step a), detecting a system key code corresponding to the first data, and sending the system key code to said computer system.

9. A method according to claim 8, further comprising the step of:

e) erasing the key scan code held in said holding means when the system key code is sent in the step d).

10. A method according to claim 9, wherein said keyboard system has a flag area, the step b) includes the step of, when the key scan code is held in said holding means, setting a flag in the flag area and resetting the flag in the flag area when the system key code is sent in the step d).

11. A method according to claim 10, wherein said holding means includes a first holding area for holding a first key scan code and a second holding area for holding a second key scan code, the step c) includes the step of, when it is determined in accordance with the key scan code generated by said code generator that a key except for the specific key is depressed, holding the key scan code generated by said code generator in the first holding area of said holding means as the first scan code, and the step d) includes the step of, when it is determined in the step b) that the key scan code is held in said holding means, holding the next key scan code generated by said code generator in the second holding area of said holding means as the second key scan code.

12. A method according to claim 11, wherein the step e) includes the step of, when it is determined in the step d) that no system key code corresponding to the first data is detected, erasing the first and second key scan codes held in said holding means, and the step d) includes the step of, when it is determined in the step d) that no system key code corresponding to the first data is detected, resetting the flag in the flag area.

* * * * *